United States Statutory Invention Registration [19]

[11] Reg. Number: H535

Sam et al. [43] Published: Oct. 4, 1988

[54] COMPACT DEVICE FOR CONTINUOUS REMOVAL OF WATER FROM AN AIRSTREAM-CASCADE SCREEN

[75] Inventors: Richard G. Sam, Hanover; Bharatan R. Patel, Etna; F. Miguel Joos, Hanover, all of N.H.; Douglas R. Barnes, Xenia, Ohio

[73] Assignee: The United States of America as represented by the Secretary of the Air Force, Washington, D.C.

[21] Appl. No.: 110,808

[22] Filed: Oct. 21, 1987

[51] Int. Cl.[4] ..... B01D 33/22; B01D 33/38; B01D 39/10; B01D 46/10

[52] U.S. Cl. ..... 55/296; 55/295; 55/306; 55/428; 55/525; 98/1.5; 244/118.5

[58] Field of Search ..... 55/306, 296, 297, 295, 55/423, 428, 525; 98/1.5; 244/118.5; 60/39.07

[56] References Cited

U.S. PATENT DOCUMENTS

| | | | |
|---|---|---|---|
| 718,805 | 1/1903 | Watts | 55/423 |
| 1,470,950 | 10/1923 | Adams | 55/296 |
| 1,484,260 | 2/1924 | Gibbs | 55/296 |
| 2,596,518 | 5/1952 | Bahnson, Jr. | 55/296 X |
| 2,871,671 | 2/1959 | Bartlett, Jr. et al. | 98/1.5 X |
| 2,881,116 | 4/1959 | Siegfried | 55/525 X |
| 3,177,679 | 4/1965 | Quick et al. | 98/1.5 X |
| 3,329,377 | 7/1967 | Peterson et al. | 244/53 |
| 3,352,104 | 11/1967 | Duerr | 60/13 |
| 3,394,533 | 7/1968 | Li et al. | 55/525 X |
| 3,449,891 | 6/1969 | Shohet et al. | 55/306 |
| 3,880,626 | 4/1975 | Griwatz et al. | 55/525 X |
| 4,158,449 | 6/1979 | Sun et al. | 55/306 X |
| 4,261,416 | 4/1981 | Hamamoto | 244/118.5 X |
| 4,367,078 | 1/1983 | Hendrix | 55/184 |
| 4,523,517 | 6/1985 | Cronin | 98/1.5 |

FOREIGN PATENT DOCUMENTS 173789 1/1922 United Kingdom ..... 55/296

OTHER PUBLICATIONS

Perry, J. H., "Chemical Engineers' Handbook", 4th ed., New York, McGraw-Hill Book Co., 1963, pp. 21-51.

*Primary Examiner*—John F. Terapane
*Assistant Examiner*—Susan Wolffe
*Attorney, Agent, or Firm*—Bobby D. Scearce; Donald J. Singer

[57] ABSTRACT

A separator for removing frozen or condensed water from an air stream, such as to aircraft environmental and avionics cooling systems, is described which comprises a generally tubular housing having an inlet and outlet, one or more screens of selected mesh size disposed in preselected spacing generally transverse of a direction of air flow within the housing, a brush or wiper disposed against each screen for removing moisture from each screen, either the screen or contacting brush being rotatable relative to the other, a motor operatively connected to the rotatable screen or brush for rotating one against the other to remove moisture from the screen, and a conduit operatively connected to the housing for draining moisture therefrom.

8 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COMPACT DEVICE FOR CONTINUOUS REMOVAL OF WATER FROM AN AIRSTREAM-CASCADE SCREEN

RIGHTS OF THE GOVERNMENT

The invention described herein may be manufactured and used by or for the Government of the United States for all governmental purposes without the payment of any royalty.

BACKGROUND OF THE INVENTION

The present invention relates generally to environmental control systems for aircraft, and more particularly to a compact device for removing suspended water, snow and ice from the air supply system of an aircraft.

Aircraft have environmental control systems (ECS) which may include an air supply for cabin air or avionics cooling which is connected to the compressor region of the engine or auxiliary power unit (APU) of the aircraft. Bleed air at high temperature and pressure is conducted from the engine or APU, passed through a series of heat exchangers and valves, and expanded through an air turbine to near ambient pressure to achieve the desired cooling. The cooled air at the turbine outlet normally is below about 32° F., is slightly above normal cabin pressure, and is saturated with water, a large portion of which condenses into liquid and/or freezes. The fog or snow so produced is highly undesirable in the air fed to the cabin or avionics of the aircraft.

Conventional ECS systems of aircraft operate at an air flow rate of about 25 lb/min, turbine inlet pressure of about 45–60 psia and inlet temperature of about 150° F., and turbine outlet pressure of about 1.1 psig. Fogging or icing occurs at the turbine outlet when the ambient air has a moisture content of at least 90 grains of water per 1 b of air, which translates to ambient conditions where the air temperature is 60° F. at any humidity level or is higher than 60 ° F. at high relative humidity. The foregoing analysis translates to a maximum needed ice removal rate from the ECS turbine outlet of about 0.44 $ft^3$/hr.

In existing ECS systems, cold air at the turbine outlet is mixed with additional warm bleed air to raise the air stream temperature above freezing, which severely reduces the overall cooling capacity of the ECS. Mixing bleed air with the turbine outlet air can result in loss of cooling capacity as high as 50%. Further. depending on the relative humidity of the bleed air, mixing bleed air with cold turbine outlet air can cause moisture to precipitate from the bleed air, which adds to the fogging problem. Using additional bleed air represents parasitic loss from the engine or APU and induces malfunctions and corrosion in avionics equipment. Therefore, a low pressure, low temperature water separator for removing condensed/frozen moisture at the outlet of the turbine is desirable.

The present invention solves or reduces in critical importance the problems with the prior art and meets the desired criteria just stated by providing a low temperature, low pressure separator downstream of the expansion turbine for removing water, snow or ice from the air supply of the ECS of an aircraft. The invention comprises in a representative embodiment a plurality of spaced screens mounted within a tubular housing, and upon which condensed or frozen water is captured by impaction. The captured water is removed from the screens by a wiper or brush. The screens may be rotatable within the chamber against a stationary wiper or brush, or may be stationary and the wiper or brush made to rotate against the screens. The water so removed is discharged into a container for recovery or into a drain for dispoal. A plurality of cascaded screens may be included to attain a desired efficiency or capacity of the separator. The invention may be constructed as a compact unit of less than about one cubic foot and may operate reliably at minimal pressure drop of two psi or less and collection efficiency greater than 90%. The separator may be installed as an integral part of an ECS on new aircraft or retrofitted to existing aircraft. Considering the undesirable alternative loss of cooling power suffered in existing ECS systems where bleed air is used to warm the snow or fog, a small pressure drop across the separator is acceptable while providing significant gain in ECS cooling capacity.

It is therefore a principal object of the invention to provide a device for removing condensed or frozen water from an air stream.

It is a further object of the invention to provide a compact device for removing condensed or frozen water from an air supply to an aircraft cabin and avionics.

It is a further object of the invention to provide a device for removing condensed or frozen water from an air stream using screens.

It is a further object of the invention to provide a compact reliable device for removing water particles from a high-speed gaseous stream with low pressure differential across the device.

These and other objects of the invention will become apparent as the detailed description of representative embodiments proceeds.

SUMMARY OF THE INVENTION

In accordance with the foregoing principles and objects of the invention, a separator for removing frozen or condensed water from an air stream, such as to aircraft environmental and avionics cooling systems, is described which comprises a generally tubular housing having an inlet and outlet, one or more screens of selected mesh size disposed in preselected spacing generally transverse of a direction of air flow within the housing, a brush or wiper disposed against each screen for removing moisture from each screen, either the screen or contacting brush being rotatable relative to the other, a motor operatively connected to the rotatable screen or brush for rotating one against the other to remove moisture from the screen, and a conduit operatively connected to the housing for draining moisture therefrom.

DESCRIPTION OF THE DRAWINGS

The invention will be clearly understood from the following detailed description of representative embodiments thereof read in conjunction with the accompanying drawings wherein.

DETAILED DESCRIPTION

Figure 1:
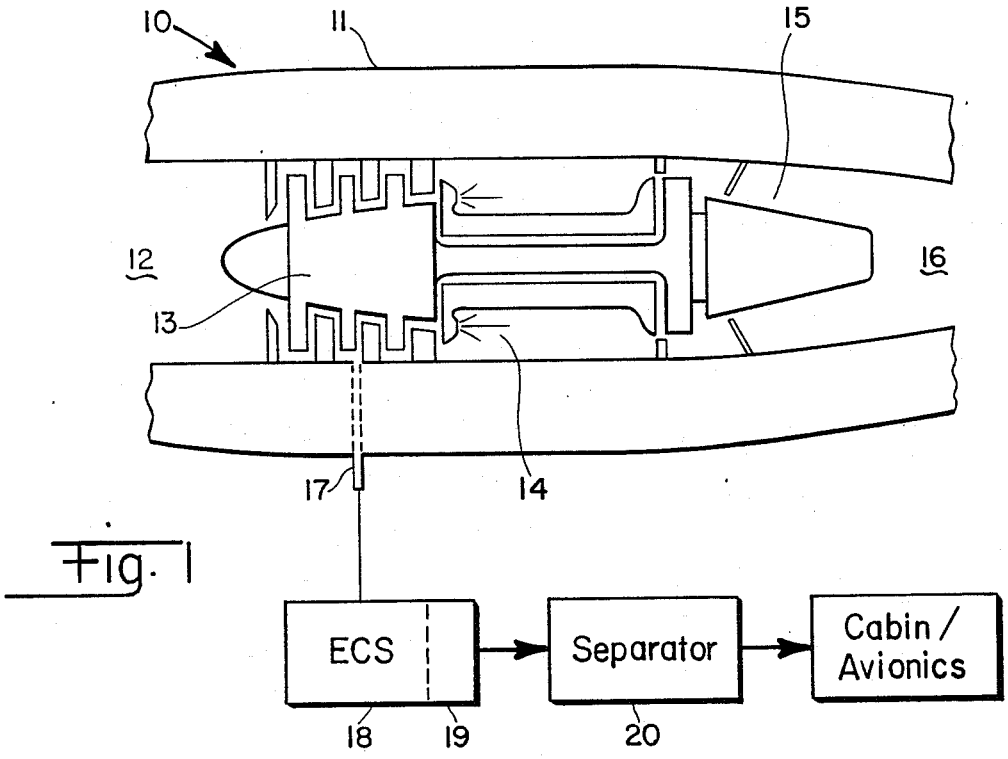
FIG. 1 is a schematic axial sectional view of a gas turbine engine having an ECS system and separator of the invention.

Referring now to the drawings, FIG. 1 shows a schematic axial sectional view of a conventional gas turbine aircraft engine 10 connected to an ECS system for the aircraft and incorporating the separator of the invention. Engine 10 may conventionally comprise a suitable supporting structure 11 defining air inlet and diffuser region 12, compressor region 13, combustor region 14, afterburner 15 and discharge region or exhaust 16. Means may be provided near compressor region 13 of engine 10 to provide a source of air under pressure for supplying the environmental control needs of the aircraft powered by engine 10. Therefore, means defining a conduit 17 may be included to supply compressed air from compressor region 13 for conditioning by ECS system 18 for subsequent use in cooling the cabin or avionics.

In accordance with the teachings of the invention, a separator 20 is disposed downstream of ECS system 18 for removing excess moisture from an air stream supplying cabin and avionics cooling in the aircraft. In operation, air from ECS system 18 is expanded to suitable temperature and pressure by expansion turbine 19 or the like included as part of ECS system 18.

Figure 2:
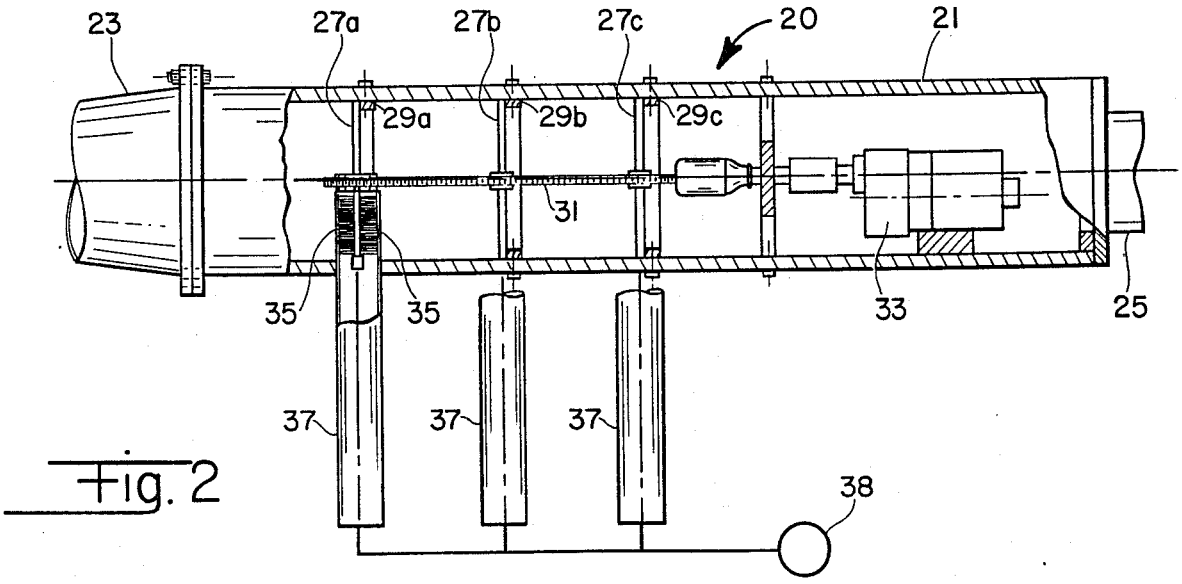
FIG. 2 is a schematic axial sectional view of a representative screen separator of the invention.

Referring now also to FIG. 2, shown therein is a schematic axial sectional view of a representative embodiment of a screen separator 20 of the invention which was built and tested in demonstration of the invention. Separator 20 comprises a tubular housing 21 of suitable conventional material having an inlet 23 for operative connection to the outlet of turbine 19 of ECS system 18 and outlet 25 for operative connection to the cabin or avionics systems requiring conditioned air. Inlet 23 may have conical shape as suggested in FIG. 2 (in the demonstration unit a 3½° conical diffuser) to provide some diffusion to air flowing from turbine 19. One or more screens (shown in representative fashion in FIG. 2 as screens *27a*, *27b*, *27c*) are disposed within housing 21 and suitably held using retaining rings *29a*, *29b*, *29c* or the like. The screens are held in preselected spacing substantially transverse of the flow (left to right as viewed in FIG. 2) of air through separator 20. Any plurality of screens may be included in the structure of separator 20, the three screens *27a*, *27b*, *27c* shown in FIG. 2 being exemplary of such plurality, and each screen defines a stage of separator 20. The number of stages (screens) selected for a particular application depends on the permissible pressure drop across the length of separator 20, which consideration includes screen sizes and spacings, housing dimensions, flow rates, operating temperature and pressure, and snow accumulation and removal rates.

In the demonstration unit, housing 21 was sized at 6.75 inches inner diameter (about 0.75 cubic foot) and the screens were spaced at 5.75 inches to yield an acceptable pressure drop for typical flow rates and screen sizes. The screens were of galvanized steel held by retainer rings of aluminum and were rotatably mounted on a shaft 31 operatively connected to a variable speed motor 33. Motor 33 controllably rotates the screens against respective brushes or wiper blades (wipers) 35 disposed on one or both sides of the respective screens for removal from the screens of snow accumulation in the operation of separator 20. Brushes with metal or synthetic fibers or wipers or the like may be used. Wire brushes 35 were used in the demonstration unit of FIG. 2. For clarity of illustration in FIG. 2, only one set of brushes 35 is shown as representative of respective sets disposed against each screen *27a*, *27b*, *27c*. Equivalent structure contemplated herein may comprise brushes or wipers 35 operatively connected to motor 33 for rotation against relatively stationary screens. Screen sizes which exhibited various degrees of snow accumulation in operation of the invention included screen wire diameters of from 0.9 to 10 mils and wire spacings from 1 to 73 mils, with a typical screen size selected with 10 mil diameter wire and 46×73 mil spacing.

A collection tube 37 disposed near each screen and connected to outlet 38 provides conduit means to collect and dispose of snow or water accumulation. Tubes 37 may be gravity drained or purged by controllably bleeding air from housing 21 through tubes 37.

Demonstration tests on a three-stage separator 20 were performed at a typical (uniform) ECS system 18 flow rate of 25 lb/min; screens *27a*, *27b*, *27c* were rotated at 20 rpm. Pressure drop across the unit typically increased as the screens accumulated snow and substantially leveled out at about 2.5 psi after about 20 minutes.

The demonstration tests further showed that the precipitation at turbine 19 outlet at temperatures below freezing has characteristics of finely constituted powdery snow rather than subcooled water droplets or granular ice particles. The measured efficiency for the three stage unit of FIG. 2 corresponded to an efficiency of about 20% per stage (screen), which efficiency was higher than expected due to the characteristics of the snow versus that of spherical micron sized particle assumed theoretically. The pressure drop across each screen was higher than expected because of high collection rates resulting from screen open area significantly reduced by snow accumulation, which is in turn affected by the snow removal rate provided by screen rotation rates against brushes 35.

The invention therefore provides a low temperature, low pressure separator for removing water, snow or ice from the air supply for the ECS of an aircraft. It is understood that certain modifications to the invention as described may be made, as might occur to one with skill in the field of this invention, within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. A device for removing moisture from a gaseous stream comprising:

(a) a generally tubular housing having an inlet and outlet for flow therethrough of said gaseous stream;

(b) a screen disposed within said housing generally perpendicular to said flow;

(c) means for removing moisture from said screen disposed within said housing in contact with said screen, said means for removing moisture and said screen disposed for relative movement therebetween;

(d) a motor, operatively connected to one of said screen and said means for removing moisture, for rotating said one of said screen and said means for removing moisture relative to the other of said screen and said means for removing moisture; and (e) conduit means operatively connected to said housing for draining moisture therefrom.

2. The device of claim 1 wherein said means for removing moisture comprises a brush.

3. The device of claim 1 wherein said means for removing moisture comprises a wiper blade.

4. The device of claim 1 wherein said screen comprises 1 to 10 mil wire in a mesh size of from 1 to 73 mils.

5. In an environmental control system of an aircraft for conditioning air under pressure for use within said aircraft, said environmental control system including expansion means for diffusing and cooling said air, an improvement comprising a moisture separator operatively connected to the outlet of said expansion means and including:

(a) a generally tubular housing having an inlet operatively connected to said outlet of said expansion means and an outlet for flow therethrough of said air;

(b) a screen disposed within said housing generally perpendicular to said flow;

(c) means for removing moisture from said screen disposed within said housing in contact with said screen, said means for removing moisture and said screen disposed for relative movement therebetween;

(d) a motor, operatively connected to one of said screen and said means for removing moisture, for rotating said one of said screen and said means for removing moisture relative to the other of said screen and said means for removing moisture; and (e) conduit means operatively connected to said housing for draining moisture therefrom.

6. The system of claim 5 wherein said means for removing moisture comprises a brush.

7. The system of claim 5 wherein said means for removing moisture comprises a wiper blade.

8. The system of claim 5 wherein said screen comprises 1 to 10 mil wire in a mesh size of from 1 to 73 mils.

* * * * *